United States Patent [19]

Durr et al.

[11] 4,388,029
[45] Jun. 14, 1983

[54] CONDITIONING APPARATUS FOR CASE METAL BARS

[75] Inventors: Helmut E. Durr, Dunwoody; George E. Mock, Duluth, both of Ga.

[73] Assignee: Western Electric Company, Inc., New York, N.Y.

[21] Appl. No.: 140,264

[22] Filed: Apr. 14, 1980

[51] Int. Cl.³ ................. B23C 1/22; B65G 17/10
[52] U.S. Cl. ..................... 409/295; 29/33 C; 29/81 G; 29/527.6; 29/DIG. 50; 164/263; 198/822; 409/137; 409/298
[58] Field of Search ............... 409/298, 301, 303, 337, 409/138, 136, 137, 294, 295; 164/70.1, 263, 477; 198/822; 29/33 C, 81 G, 527.6, 81 F, DIG. 50

[56] References Cited

U.S. PATENT DOCUMENTS

| | | |
|---|---|---|
| 395,684 | 1/1889 | Baker . |
| 1,360,001 | 11/1920 | Mathias ............................ 409/137 X |
| 1,908,786 | 5/1933 | Pioch ............................. 29/DIG. 50 |
| 1,917,381 | 7/1933 | Fairbairn . |
| 2,653,517 | 9/1953 | Pigott ............................... 409/136 X |
| 3,467,620 | 9/1969 | Ward et al. . |
| 3,780,552 | 12/1973 | Staskiewicz et al. ........... 164/263 X |
| 3,791,258 | 2/1974 | Krall et al. . |
| 3,954,044 | 5/1976 | Ridgway . |
| 3,987,536 | 10/1976 | Figueres et al. . |
| 4,077,448 | 3/1978 | Hasenwinkle et al. . |
| 4,252,235 | 2/1981 | Schepers et al. ..................... 198/822 |

Primary Examiner—Z. R. Bilinsky
Attorney, Agent, or Firm—David P. Kelley

[57] ABSTRACT

Conditioning apparatus for a cast metal bar is disclosed which comprises a conveyor having a plurality of blocks each of which has a surface depression defining a bar support and guide channel, an endless support to which the blocks are mounted in an endless series with the block bar support and guide channels tandemly aligned, and means for driving the endless support and series of blocks along a circuitous path that extends generally linearly through a bar conditioning station. The apparatus also comprises hold down roller means located at the bar conditioning station for holding a cast metal bar in the bar support and guide channels of blocks being driven through the bar condition station; means for trimming a cast metal bar supported and guided in the bar support and guide channels of blocks at the bar conditioning station, and means for flushing bar trimmings from the bar supported on the conveyor at the conditioning station.

6 Claims, 8 Drawing Figures

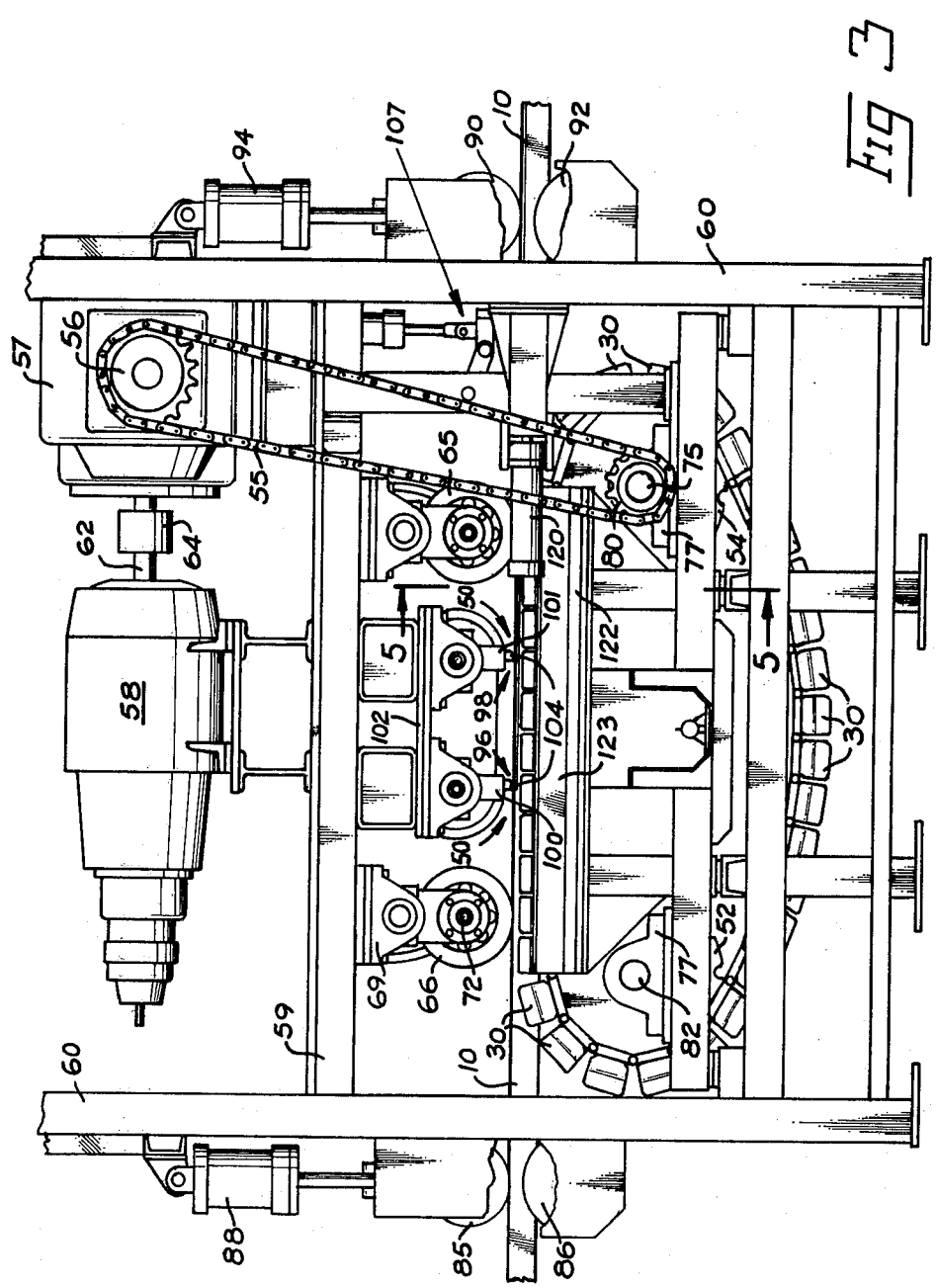

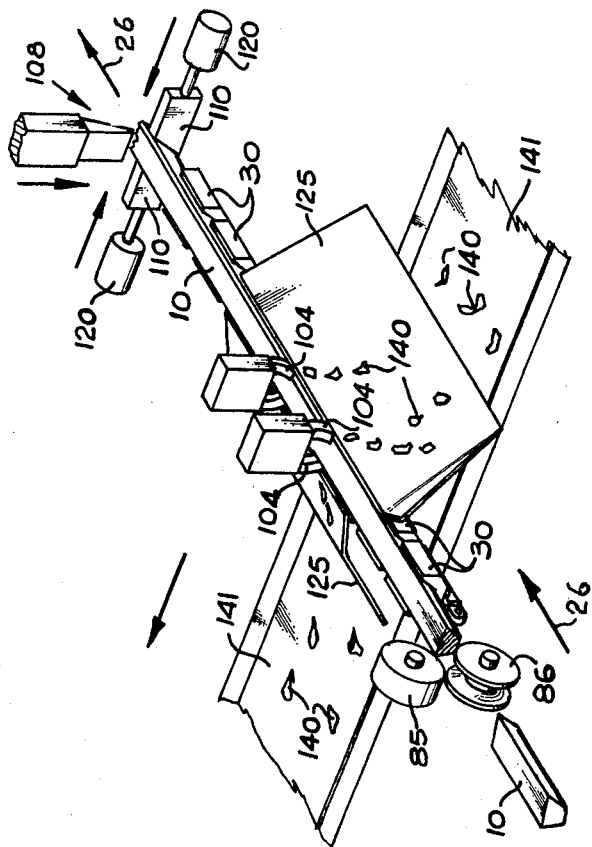
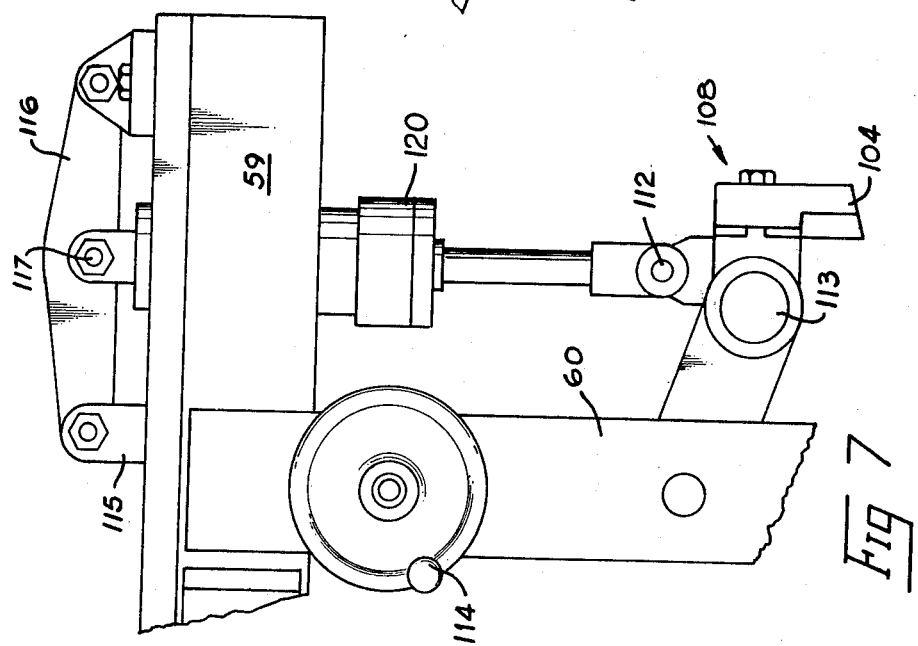

CONDITIONING APPARATUS FOR CASE METAL BARS

TECHNICAL FIELD

This invention relates to apparatuses for conditioning a cast metal bar after it has emerged from a caster in a semi-molten state prior to its entry into a rolling mill.

BACKGROUND OF THE INVENTION

In the fabrication of metallic rods the metal typically is first cast by a caster into an elongated bar shape and then conveyed to a rolling mill where the bar is drawn and rolled into a rod. As the bar emerges from the caster its corner regions often have excess flashing and casting voids. Upon entering the rolling mill the bar should have neither of these attributes since a structurally degrading imperfection would then be made in the rod formed from the bar at the mill. For this reason it has become a common practice to provide bar conditioning apparatus at a bar conditioning station located between the caster and rolling mill where corners of the bar are trimmed by cutting tools.

While passing through the bar conditioning station between the caster and rolling mill the bar has not yet cooled sufficiently to assume a rigid condition. As a result it tends to wobble about in a rather serpentine fashion as it travels towards the mill. Since it is impractical to have the trimming tools themselves follow this random movement of the bar, it has been necessary to provide means for guiding the bar through the conditioning station a well defined path so that the trimming tools may continuously and uniformly trim a preselected portion of the bar corners.

FIG. 1 schematically illustrates bar conditioning apparatus which has heretofore typically been employed at the conditioning station. Here a metal bar 10 is seen to be guided into engagement with a bar corners trimming tool 12 by a lower guide wheel 14 and a pair of upper bar hold down rollers 16. The flanges of the guide wheels engage side portions of the bar thereby maintaining lateral alignment of the bar while the hold down rollers and guide wheel together cooperate to maintain vertical alignment. The trimming tools 12 trim the two upper corners of the bar forming trimmings or chips 18 in the process. Vertical steel brushes 20 and side steel brushes 22 are positioned in rotatable engagement with all sides of the bar to brush the trimmings 18 off of the bar prior to its entering the rolling mill.

FIG. 1 also is seen to illustrate certain problems associated with bar conditioning systems of the type there shown. One problem has been the fact that some of the trimmings made by the cutting tools have been pressed back into the semi-molten bar itself by one or more of the hold down or guide rollers located downstream from the trimming tools. When this occurs a structural inhomogenity is created in the bar which later will appear as a defect in a rod produced from the bar by the rolling mill. Though the vertical and horizontal brushes do brush away a large number of the trimmings they do not in practice clear all the trimmings. Furthermore, the brushes themselves present a problem in that some of the steel bristles 24 in time are pulled off the brushes and are held to a surface of the semi-molten bar. These bristles also produce structural inhomogenities in rods subsequently rolled from the bar. Thus, a dilemma is presented at the conditioning station of either allowing the bar as it moves in the direction shown by arrow 26 from the caster toward the rolling mill to wobble somewhat whereby the cutting tool 12 effects an uneven trim, or to guide the bar positively into engagement with the cutting tool in maintaining an accurate and uniform trim but with imperfections formed in the bar by impressed chips and bristles. This dilemma is one principle problem to which the present invention is addressed.

SUMMARY OF THE INVENTION

In one form of the invention conditioning apparatus is provided for a cast metal bar which comprises a conveyor having a plurality of blocks each of which has a surface depression defining a bar support and guide channel, an endless support to which the blocks are mounted in an endless series with the block bar support and guide channels tandemly aligned, and means for driving the endless support and the series of blocks along a circuitous path that extends through a generally linear bar conditioning station. The apparatus further comprises hold down means located at the bar conditioning station for holding a cast metal bar in the bar support and guide channels of blocks being driven through the bar conditioning station, and means for trimming a cast metal bar supported and guided in the bar support and guide channels of blocks at the bar conditioning station.

In another form of the invention bar conditioning apparatus is provided for a cast metal bar which comprises an endless conveyor and means for driving the endless conveyor along a circuitous path that extends generally linearly through a bar conditioning station. The apparatus further comprises means for holding a cast metal bar on the endless conveyor at the bar conditioning station without substantial relative movement between the bar and bar supporting portions of the conveyor at the bar conditioning station, means for trimming a cast metal bar supported on the endless conveyor at the bar conditioning station, and means for flushing bar trimmings from a cast metal bar supported on the conveyor and from the conveyor.

BRIEF DESCRIPTION OF THE DRAWING

FIG. 3 is a side elevational view of bar conditioning apparatus embodying principles of the invention.

FIG. 5 is a cross-sectional view of a portion of the apparatus shown in FIG. 3 taken along plane 5—5.

FIG. 6 is a cross-sectional view of a portion of the apparatus shown in FIG. 2 taken along a plane passing beneath a spray nozzle illustrated therein.

FIG. 7 is a side elevational view of a scraper component of the apparatus shown in FIG. 4 together with scraper blade adjustment means.

FIG. 8 is a perspective view of a portion of the apparatus shown in FIG. 3 showing bar trimmings being deflected onto a conveyor belt.

DETAIL DESCRIPTION OF THE DRAWING

Figure 1:
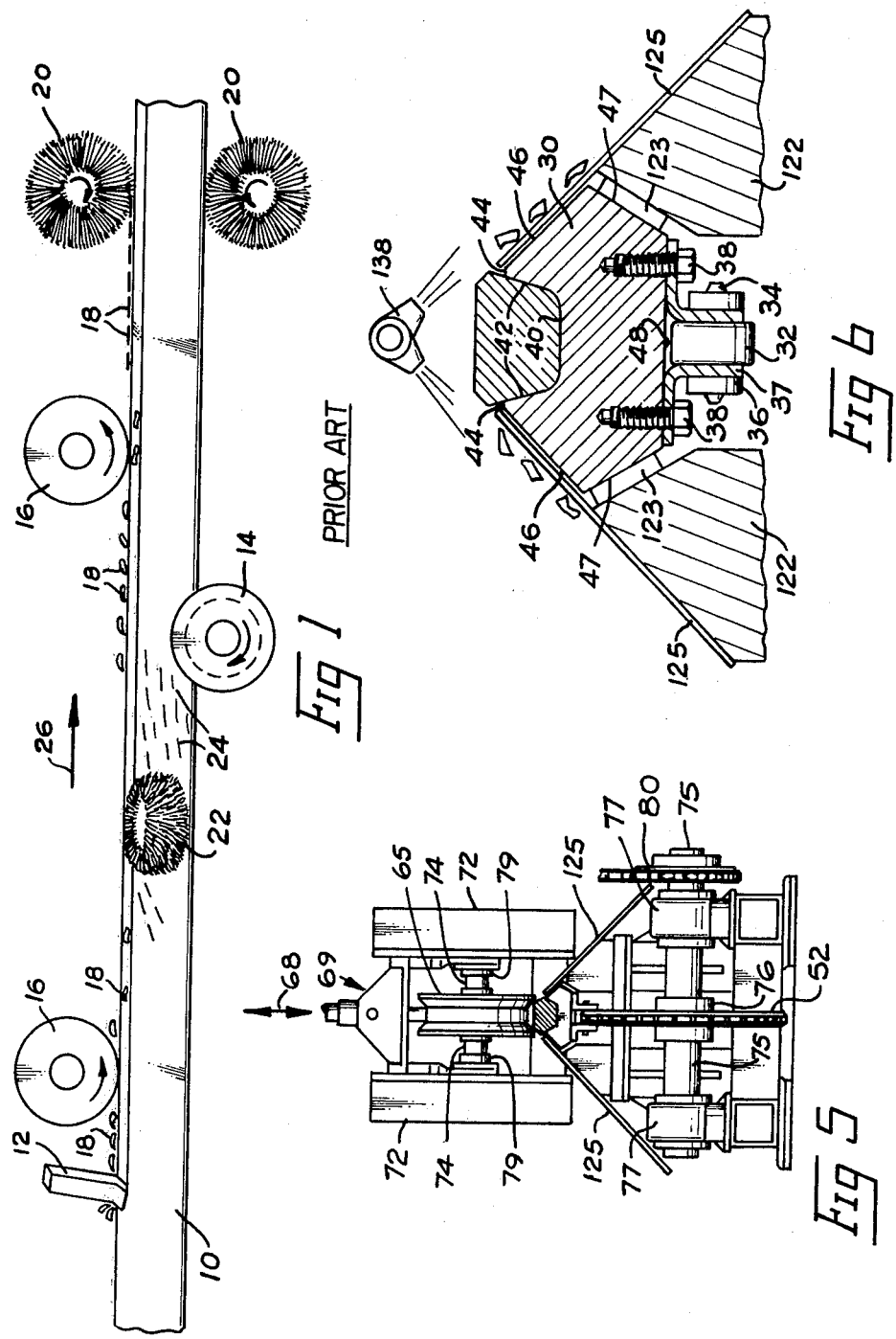
FIG. 1 is a schematic illustration of cast metal bar conditioning apparatus of the prior art.

Referring now in more detail to the drawing, there is shown conditioning apparatus for a cast metal bar such as one composed of copper which has just emerged from a caster. The apparatus is seen to include a conveyor having a set of blocks 30 mounted in an endless series upon an endless flexible support in the form of a roller chain. The chain is seen in FIG. 6 to have a series of rollers 32 mounted by pins 34 to links 36 and 37 the latter of which being of inverted L-shaped configuration. Screws 38 are passed through holes in the links 37 and threadedly received within the body of the blocks 30 in securely fastening the blocks to the chain. Each block itself, which may be of 41-40 steel composition, has a surface distal the chain that is bisected by a surface depression defining bar support and guide channel that extends the full length of the block between planar block ends. Each block channel has a floor 40 from which two channel side walls 42 upwardly extend to elongated channel lips 44. The exterior sides of the blocks include two planar side sections 46 which divergently descend along opposed inclines down from the channel lips 44 and which merge with other side section 47 that descend convergently downwardly further to merge with a block surface 48 that is mounted flush atop the roller chain. Each of the other blocks are mounted to the chain with this same orientation so that the channels are tandemly aligned.

The conveyor is mounted for movement along a circuitous path a portion of which extends linearly through a horizontally oriented, linear work station 50 where a semi-molten metal bar supported and guided on the conveyor is conditioned prior to being conveyed into a rolling mill. The conveyor rolling chain is routed over two sprocket wheels 52 and 54, the latter of which is driven by an endless chain 55 engaged with a sprocket 56 mounted to a drive shaft projecting outwardly from a gear box 57. Te sprocket 56 is powered by a conveyor drive motor 58 having is mounted atop a beam 59 that forms part of the apparatus frame 60. The power train between motor 58 and the conveyor is completed by a motor drive shaft 62 that is coupled by coupling 64 with the gear box 57.

The bar conditioning apparatus is further seen to have a pair of bar hold down rollers 65 and 66 which are rotatably suspended beneath beam 59 and which may be vertically adjusted as indicated by arrow 68 in FIG. 5 with an adjustment mechanism generally indicated at 69. A pair of roller bearings 70 is mounted to the inside of opposed roller bearing mounts 72 into which a roller shaft 74 is rotatably positioned. Sprocket 54 is also seen to be driven by a sprocket drive shaft 75 that extends out of a sprocket hub 76 through bearings 77 to a pulley 80. The other sprocket 52 is similarily mounted to a shaft 82 which rotates freely in a bearing within bearing housing 77.

The bar conditioning apparatus is further seen to include a pair of vertical feed rollers 85 and 86 located along the approach of the cast metal bar to the conditioning station. The upper feed roller 85 is biased downwardly by an air cylinder 88 to permit some dampening action by the feed rollers where an incoming portion of the bar is located below or above the plane of the work station. Another pair of vertical feed rollers 90 and 92 is located downstream of the work station with the upper roller 90 also biased in a downwardly direction by an air cylinder 94.

The apparatus also includes a pair of bar trimming or cutting tools 96 and 98 adjustably positioned at various elevations by adjustment means generally indicated at 100 and 101 in FIG. 3 suspended beneath a mount 201 which depends from the bean 59. Each cutting tool has a pair of blades 104 shown in detail by FIG. 4 as comprising carbon tips 105 positioned to level the two upper corners of the metal bar at the bar conditioning work station. Spray nozzles are also positioned over the conveyor adjacent each cutting tool. For clarity the nozzles have not been shown in detail illustration of FIG. 3 but only schematically in FIG. 2 and in the sectional view of FIG. 6.

A scraper assembly, generally indicated at 107 in FIG. 3, is also provided at the work station adjacent the vertical feed rollers 90 and 92. As best shown in FIGS. 7 and 8 the scraper assembly has an upper scraper blade 108 and two side scraper blades 110 which are used in scraping the uppermost surface and the two principle side surfaces of the bars as they depart the conveyor. Each scraper includes a scraper blade 104 coupled with an air cylinder 120 by a hinge 112. The position of blade 104 is adjustable by rotation of a crank handle 114 to which another link 115 is coupled. This action serves to pivot yet another link 116 to which the cylinder 120 is mounted about a pivot pin 117.

Figure 4:
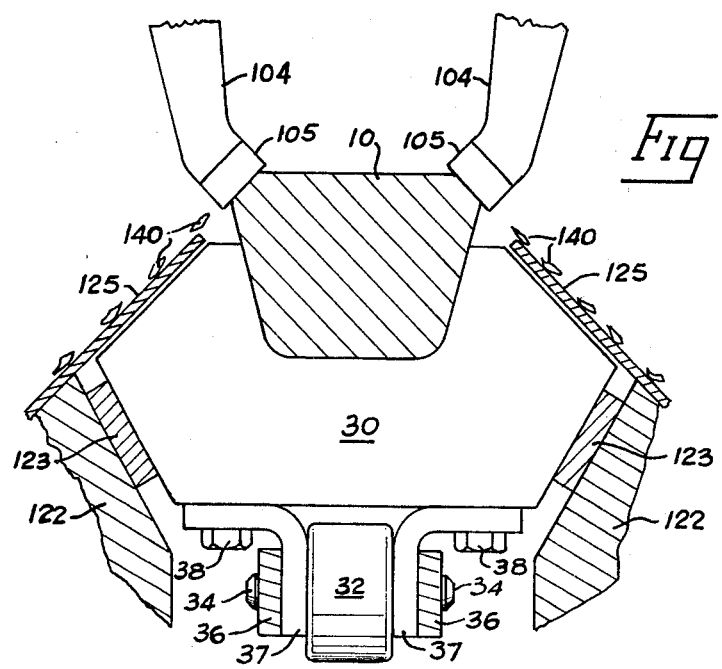
FIG. 4 is a cross-sectional view of a portion of the apparatus shown in FIG. 2 taken along the plane 4—4.

In FIGS. 4 and 6 the bar conditioning apparatus is seen to include two wear plate holders 122 to inclined, inwardly confronting surfaces which two wear plates 123 are mounted and upon which the blocks 30 slide and are guided as they travel through the work station. A pair of defector plates 125 are rigidly mounted atop outwardly facing, inclined surfaces of the wear plate holders overlaying a portion of the upper surfaces of the blocks 30 as they pass through the work station. For clarity, the defector plates have not been shown in FIG. 3.

Figure 2:
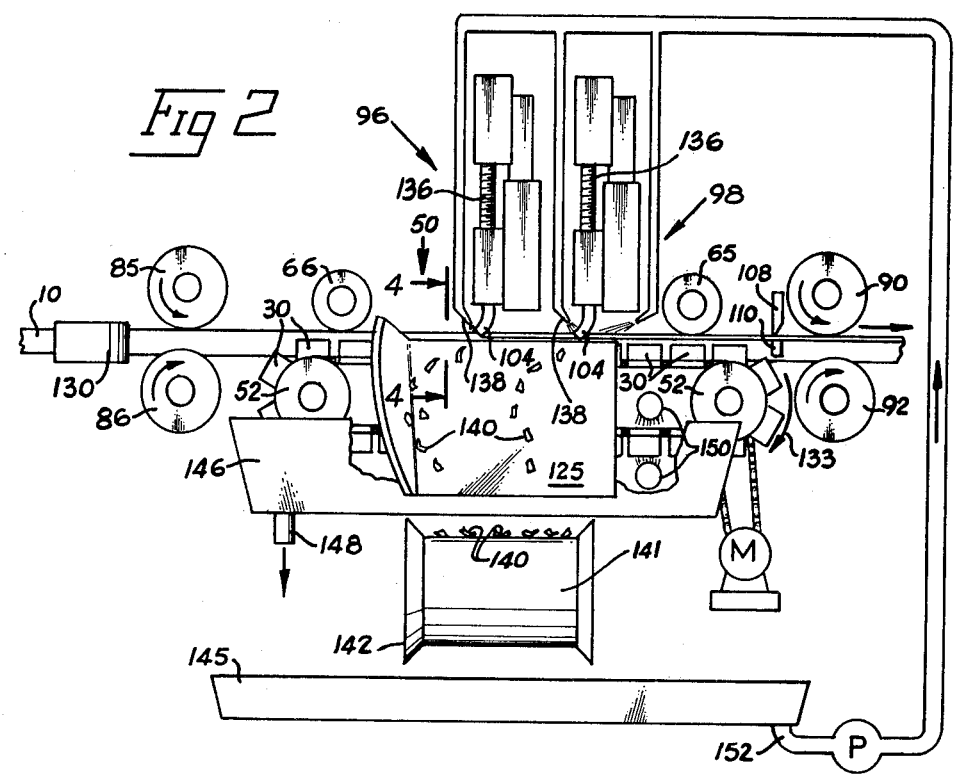
FIG. 2 is a schematic illustration of bar conditioning apparatus embodying principles of the present invention.

With particular reference next to FIGS. 2 and 8 the manner in which the just described apparatus operates may be readily understood. A copper bar 10 in a semi-molten state is routed towards the work station 50 between the vertical feed rollers 85 and 86, and also through a pair of horizontal feed rollers 130 schematically shown in FIG. 2 onto the conveyor blocks 30. At this time the blocks are being moved in the direction shown by arrow 133 in an endless path that passes horizontally and linearly through the work station. The blocks in tandem form a moving, elongated though segmented channel at the work station which receives, supports and guides the bar as it travels through the station. The conveyor is preferably driven at a speed to provide no relative movement between the blocks and the bar. The bar enters into the work station through hold down rollers 66 and into seating engagement with the conveyor block channels. At this point it will be seen that the bar is now traveling along a predetermined path with any tendency to wobble about restricted by the hold down roller and the conveyor blocks. As a result the bar engages the trimming blades. As trimming occurs a spray of liquid, preferably oil based lubricant is emitted from nozzle 138 which forces the trimmings 140 off of the bar and the conveyors blocks onto the deflector plates 125. There the trimmings descend down over the plates along with the liquid lubricant onto a trimmings conveyor in the form of a preforated, continuous belt 141 mounted upon rollers 142. The trimmings are conveyed away from the work station by the belt 141 while the lubricating liquid descends about and through the preforations of the belt into a sump 145. At the same time the lubricant descends about the deflector plates also into a trough 146 located above the sump. From time to time the trough may be emptied by use of a drain 148. During operations however the flow of the lubricating liquid is maintained such as to overflow the trough into the sump.

It should be noted that the trough is located in a position beneath the work station along the conveyor path whereby the conveyor itself passes therethrough and is continuously lubricated and cleaned. A pair of nozzles 150 is located in the trough to emit a spray under force against the conveyor in further enhancing its cleaning and lubrication. A lubricant return system is provided in the form of a conduit 152, a pump, and an unshown filtering system by which liquid lubricant is returned from the sump to the various spray nozzles. The trough and sump have not been shown in FIG. 3, again for clarity of explanation.

Finally, after the bar has been trimmed and sprayed its surfaces are scraped by the scrapers 108 and 110 which are mounted at a slight angle to normal the direction of bar travel. Thus here any residual trimmings still on the bar are directed off to one side of the bar. The bar is then moved off the conveyor under hold down roller 65, through the vertical feed rollers 90 and 92 out of the work station to a rolling mill.

The just described bar conditioning apparatus thus provides means for conveying a metal bar which has just been cast through a bar conditioning station where its corners are trimmed with the bar properly aligned with the trimming tools. This may be done in a manner by which most of the trimmings cut from the bar by the trimming tools at the work station descend off of the bar and out of the station without becoming pressed into the semi-molten bar to become an integral part thereof as when brought into contact with feed rollers on the like heretofore used in guiding the bar. The apparatus is also seen to eliminate the requirement for brushes to sweep bar trimmings from the upper and side surfaces of the bar and the attendant risk of the brush bristles also becoming lodged in the solidifying bar structure.

It should be understood that the just described embodiment merely illustrates principles of the invention in one preferred form. Many modifications, additions and deletions may, of course, be made thereto without departure from the spirit and scope of the invention as set forth in the following claims.

What is claimed is:

1. Conditioning apparatus for a cast metal bar comprising a conveyor having a plurality of blocks each of which has a surface depression defining a bar support and guide channel, an endless support to which said blocks are mounted in an endless series with said block bar support and guide channels tandemly aligned, and means for driving said endless support and said series of blocks along a circuitous path that extends generally linearly through a bar conditioning station; hold down roller means located at said bar conditioning station for holding a cast metal bar in said bar support and guide channels of blocks being driven through said bar conditioning station; and means for trimming a cast metal bar supported and guided in said bar support and guide channels of blocks being driven through said bar conditioning station.

2. Conditioning apparatus for a cast metal bar in accordance with claim 1 wherein each of said blocks has a surface distal said support bisected by said channel into two surface sections that divergently decline downwardly aside said channel.

3. Conditioning apparatus for a cast metal bar in accordance with claim 2 further comprising a pair of deflector plates overlaying portions of said block declining surface sections at said bar condition station.

4. Conditioning apparatus for a cast metal bar in accordance with claim 3 further comprising a trough overlaid by said deflector plates into which said conveyor extends beneath said bar conditioning station, and a body of liquid lubricant disposed within said trough.

5. Conditioning apparatus for a cast metal bar in accordance with claim 1, 2 or 3 further comprising means for flushing bar trimmings from the bar and said conveyor at said bar conditioning station.

6. Conditioning apparatus for a cast metal bar comprising an endless conveyor; means for driving said endless conveyor along a circuitous path that extends generally linearly through a bar conditioning station; means for holding a cast metal bar on said endless conveyor at the bar conditioning station without substantial relative movement between the bar and bar supporting portions of said conveyor at the bar conditioning station; means for trimming a cast metal bar supported on said endless conveyor at the bar conditioning station; a pair of deflector plates straddling said conveyor at the bar conditioning station with each deflector plate mounted along an incline overlaying a portion of said endless conveyor; and means for flushing bar trimmings from a cast metal bar supported on said conveyor onto said deflector plates and from said endless conveyor at the bar conditioning station.

* * * * *